(12) United States Patent
Alrabady

(10) Patent No.: US 8,015,404 B2
(45) Date of Patent: Sep. 6, 2011

(54) SYSTEM AND METHOD FOR COLLECTING TRAFFIC DATA USING PROBE VEHICLES

(75) Inventor: Ansaf I. Alrabady, Livonia, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1260 days.

(21) Appl. No.: 11/229,116

(22) Filed: Sep. 16, 2005

(65) Prior Publication Data

US 2007/0067829 A1    Mar. 22, 2007

(51) Int. Cl.
*H04L 9/32* (2006.01)
(52) U.S. Cl. ........ 713/168; 713/150; 713/155; 713/156; 713/157; 713/158; 713/159; 380/229; 705/67
(58) Field of Classification Search .................. 713/150, 713/155–159, 168; 380/229; 705/67
See application file for complete search history.

(56) References Cited

U.S. PATENT DOCUMENTS 6,708,085 B2 * 3/2004 Yamane et al. .................. 701/1
6,714,982 B1    3/2004 McDonough et al.
7,076,653 B1 * 7/2006 Remer et al. .................. 713/155
2005/0232593 A1 * 10/2005 Kanai .............................. 386/94

FOREIGN PATENT DOCUMENTS

DE         10204135 A1    8/2003

OTHER PUBLICATIONS

T. Dierks et al., "The TLS Protocol, Version 1.0", RFC 2246, Jan. 1999, www.ietf.org/rfc/rfc2246.txt.

* cited by examiner

*Primary Examiner* — Edan Orgad
*Assistant Examiner* — Roderick Tolentino

(57) ABSTRACT

A system and method for authenticating the source and ensuring the integrity of traffic data collected from probe vehicles while maintaining the privacy of the data's source. This is accomplished by dividing the traffic analysis functionality into two distinct responsibilities: data collection, including authentication and verification, and data processing, and assigning each responsibility to a different entity, such the first entity has access to authentication information which identifies the data's source but not to traffic information such as the source's location, and the second entity has access to the traffic information but not to the authentication information which identifies the data's source.

8 Claims, 2 Drawing Sheets

SYSTEM AND METHOD FOR COLLECTING TRAFFIC DATA USING PROBE VEHICLES

TECHNICAL FIELD

The present invention relates to systems and methods for collecting traffic data using probe vehicles. More specifically, the present invention concerns a system and method for authenticating the source and ensuring the integrity of traffic data collected from probe vehicles while maintaining the privacy of the data's source. This is accomplished by dividing the traffic analysis functionality into two distinct responsibilities: (1) data collection, including authentication and verification, and (2) data processing, and assigning each responsibility to a different entity, such the first entity has access to authentication information which identifies the data's source but not to traffic information such as the source's location, and the second entity has access to the traffic information but not to the authentication information which identifies the data's source.

BACKGROUND OF THE INVENTION

It is known in the prior art to use vehicles as probes for measuring traffic conditions in real-time. Individual vehicles provide "floating car data", such as, for example, the vehicle's time, speed, position, and heading, which can be used to estimate travel time and traffic speed.

It can be desirable, for a variety of different purposes, to have access to real-time traffic data. This data can be used, for example, as an online indicator of road network status, as a basis for detecting incidents, or as input for a dynamic route guidance system. A Traffic Data Service, for example, uses such information to provide real-time traffic information to subscribers. The service depends both on the ability to collect and use traffic data received from probe vehicles, and on the integrity of the collected data. When this data is associated, such as by a user ID, with a particular probe vehicle, or a particular owner or operator of a probe vehicle, it may be considered to be private information, the collection of which may have significant social or legal implications. One way to address privacy concerns is to not associate the data in this manner, i.e., to collect the data from sources that remain entirely anonymous. Unfortunately, this approach could potentially adversely impact the authenticity and integrity of the collected data.

SUMMARY OF THE INVENTION

The present invention provides a system and method allowing for authenticating the source and ensuring the integrity of collected traffic data while maintaining the privacy of the data's source. This is accomplished by dividing the traffic analysis functionality into two distinct responsibilities: data collection and data processing, and assigning each responsibility to a different entity. Data collection is assigned to the first entity whose responsibility is substantially limited to collecting data; authenticating the source of the data; and verifying the integrity of the data. The first entity has no interest in the content of the data and no ability to access it. Data processing is assigned to the second entity whose responsibility is substantially limited to receiving the data from the first entity; analyzing and processing the data; and providing traffic information to subscribers. The second entity has no interest in who contributed the data and no ability to find out.

In exemplary implementation, the system makes use of three keys and three corresponding keys. It will be appreciated that the corresponding keys correspond operatively to the similarly numbered keys so that, for example, data encrypted using the first key can be decrypted using the first corresponding key. Using a first key, a probe vehicle encrypts the private data. Using a second key, the probe vehicle sends the encrypted data to the first entity along with fields for authenticating the probe vehicle and verifying the data's integrity. Using a second corresponding key, the first entity authenticates the probe vehicle and verifies the data's integrity. The first entity cannot access the data's content because the first entity does not have the first corresponding key. The first entity removes all identification fields for the probe vehicle. Using a third key, the first entity sends the verified data to the second entity along with fields for authenticating the first entity. Using a third corresponding key, the second entity authenticates the first entity. Using a first corresponding key, the second entity decrypts the data for analysis. The second entity cannot know the source of the data because all identification fields for the probe vehicle were filtered by the first entity, and, in any event, the second entity does not have the first corresponding key.

Thus, it will be appreciated and understood that the system and method of the present invention provide a number of advantages over the prior art, including, for example, allowing for authenticating the source and ensuring the integrity of collected traffic data while maintaining the privacy of the data's source.

These and other features of the present invention are discussed in greater detail in the section below titled DESCRIPTION OF THE PREFERRED EMBODIMENT(S).

BRIEF DESCRIPTION OF THE DRAWINGS

A preferred embodiment of the present invention is described in detail below with reference to the attached drawing figures, wherein.

DESCRIPTION OF THE PREFERRED EMBODIMENT(S)

Figure 1:
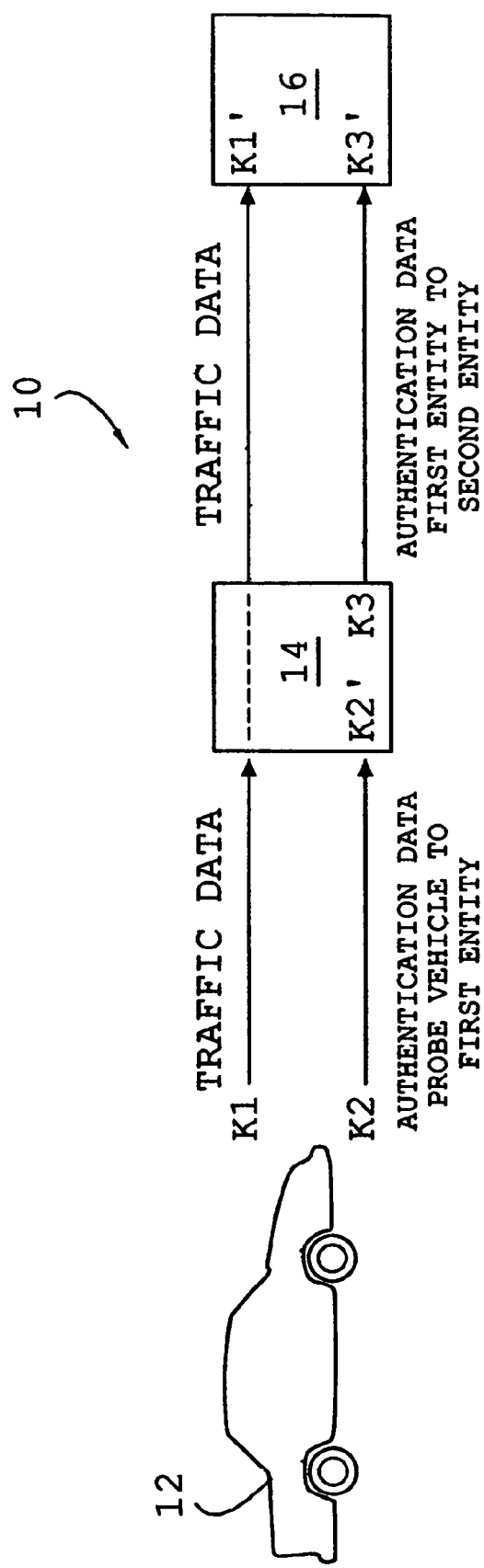
FIG. 1 is a depiction of a preferred embodiment of the system of the present invention.

With reference to the figures, a system 10 and method is herein described and otherwise disclosed in accordance with a preferred embodiment of the present invention. Broadly, referring particularly to FIG. 1, the system 10 and method of the present invention allow for authenticating the source and ensuring the integrity of traffic data contributed by a probe vehicle 12 while maintaining the privacy of the source. This is accomplished by dividing the traffic analysis functionality into two distinct responsibilities: data collection and data processing, and assigning each responsibility to a different entity. Data collection is assigned to a first entity 14, hereinafter referred to also as a Communication Server (CS) agent, whose responsibility is substantially limited to collecting data from probe vehicles 12; authenticating the source of the data; and verifying the integrity of the data. The CS agent 14 has no interest in the content of the data and no ability to access it. Data processing is assigned to second entity 16, hereinafter also referred to as a Traffic Service Provider (TSP), whose responsibility is substantially limited to receiving the data from the CS agent 14; analyzing and processing the data; and providing traffic information to subscribers. The TSP 16 has no interest in who contributed the data and no ability to find out.

Each probe vehicle 12 has a pair of keys, a first key, K1, and a second key, K2; the CS agent 14 has a pair of keys, a second corresponding key, K2', and a third key, K3; and the TSP has a pair of keys, a first corresponding key, K1', and a third corresponding key, K3'. It will be appreciated that the corresponding keys correspond to the similarly numbered keys so that, for example, data encrypted using the first key can be decrypted using the first corresponding key. K1 is a public key that is common to all probe vehicles 12 and is used for encrypting all private data. There may be no benefit to making K1 a private key because it might be possible to discover K1 by inspecting the probe vehicle's electronics, in which case the private data might be compromised. However, the corresponding key, K1', is a private key that is known only to the TSP 16. K2 is an authentication key that is unique to each probe vehicle 12, and may be programmed into the vehicle when the vehicle is manufactured. K2 is used along with the corresponding key, K2', at the CS agent 14 to authenticate the contributing probe vehicle 12 and verify the integrity of the data message. K3 is used along with the corresponding key, K3', for mutual authentication between the CS agent 14 and the TSP 16.

Authentication between the probe vehicles 12 and the CS agent 14, and between the CS agent 14 and the TSP 16, can be accomplished in a number of different ways. Authentication could be, for example, based on a password or password exchange protocol or on a challenge/response protocol. In one contemplated implementation, for example, the CS agent 14 sends a randomly generated number, word, or alphanumeric string to the probe vehicle 12 as a challenge; the probe vehicle 12 encrypts the string using K2 and sends it back to the CS agent 14 as a response; and the CS agent 14 decrypts the string using K2' and checks for correctness. If the decrypted string matches the string originally sent by the CS agent 14, then the probe vehicle 12 is authenticated.

Figure 2:
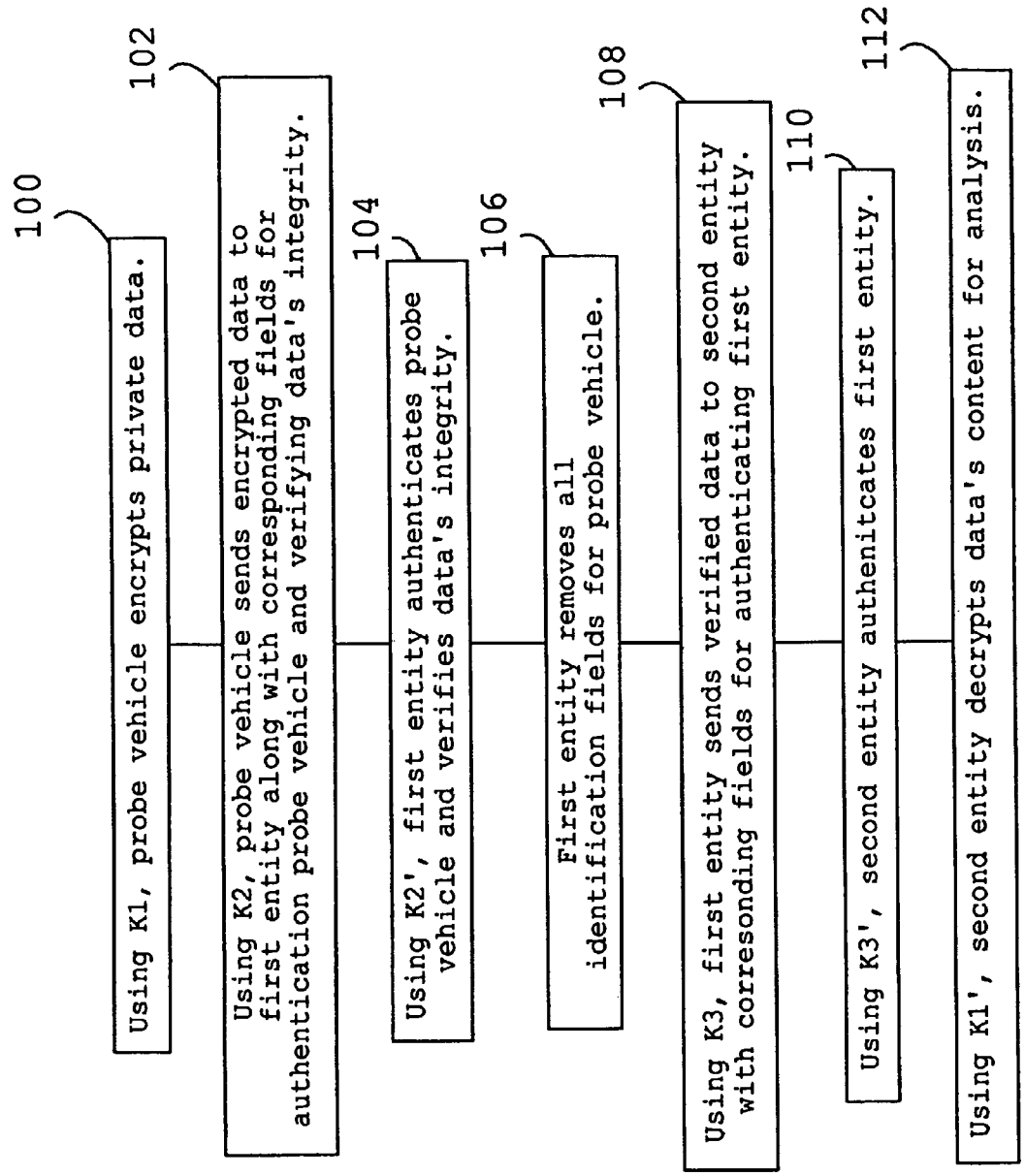
FIG. 2 is a flowchart of a preferred embodiment of the method of the present invention.

Referring particularly to FIG. 2, the method of the present invention may, in exemplary implementation, proceed substantially as follows. Using K1, a probe vehicle 12 encrypts the private data, as depicted in box 100. Using K2, the probe vehicle 12 sends the encrypted data to the CS agent 14 along with corresponding fields for authenticating the probe vehicle and verifying the data's integrity, as depicted in box 102. Using K2', the CS agent 14 authenticates the probe vehicle 12 and verifies the data's integrity, as depicted in box 104. The CS agent 14 cannot access the data's content because the CS agent 14 does not have the corresponding key, K1', for decrypting it. The CS agent 14 removes all identification fields for the probe vehicle 12, as depicted in box 106. Using K3, the CS agent 14 sends the verified data to the TSP 16 with corresponding fields for authenticating the CS agent 14, as depicted in box 108. Using K3', the TSP 16 authenticates the CS agent 14, as depicted in box 110. Using K1', the TSP 16 decrypts the data's content for analysis, as depicted in box 112. Such analysis may include, for example, determining some condition or characteristic of traffic for subsequent reporting to service subscribers. The TSP 16 cannot know the original source of the data because all identification fields for the probe vehicle 12 were filtered by the CS agent 14, and, in any event, the TSP 16 does not have K2'.

From the preceding discussion, it will be appreciated and understood that the system and method of the present invention provide a number of advantages over the prior art, including, for example, allowing for authenticating the source and ensuring the integrity of collected traffic data while maintaining the privacy of the data's source.

Although the present invention has been described with reference to the preferred embodiments illustrated in the drawings, it is noted that equivalents may be employed and substitutions made herein without departing from the scope of the invention as recited in the claims. For example, though described herein as being used to collect traffic data, it will be appreciated that the present invention may be used to collect other types of data as well.

Having thus described the preferred embodiment of the invention, what is claimed as new and desired to be protected by Letters Patent includes the following:

1. A method of collecting data from and retaining the anonymity of a source, wherein the data is encrypted using a first key, said method comprising the steps of:
    (a) encrypting first authentication and verification information for the source using a second key at the source;
    (b) electronically sending the encrypted data and the encrypted first authentication and verification information to a first entity separate from the source;
    (c) decrypting the first authentication and verification information using a second corresponding key, and electronically authenticating the source and verifying the data at the first entity;
    (d) encrypting second authentication information for the first entity using a third key;
    (e) electronically sending the encrypted data and the encrypted second authentication information to a second entity;
    (f) decrypting the second authentication information using a third corresponding key, and electronically authenticating the first entity; and
    (g) decrypting the data using a first corresponding key at the second entity, such that neither the first nor second entity can access both the data and the authentication and verification information for the source, and a secure connection is established between the source and second entity without the second entity accessing the information for the source.

2. The method as set forth in claim 1, wherein the source is a probe vehicle and the data is traffic data.

3. The method as set forth in claim 2, further including the step of analyzing the traffic data to determine a traffic characteristic.

4. The method as set forth in claim 1, wherein authenticating the source at the first entity, and authenticating the first entity at the second entity, involves one or more password-based protocols.

5. The method as set forth in claim 1, wherein the authentication information for the source is removed by the first entity and is not provided to the second entity.

6. A method of collecting traffic data from and retaining the anonymity of a probe vehicle, the method comprising the steps of:
    (a) encrypting the traffic data using a first key at the probe vehicle, wherein the first key is a public key;
    (b) encrypting first authentication and verification information for the probe vehicle using a second key;
    (c) electronically sending the encrypted traffic data and the encrypted first authentication and verification information to a first entity;
    (d) decrypting the first authentication and verification information using a second corresponding key, and electronically authenticating the probe vehicle and verifying an integrity of the traffic data, wherein the encrypted traffic data is not decryptable by the first entity;

(e) removing the first authentication and verification information at the first entity;
(f) encrypting second authentication information for the first entity using a third key;
(g) electronically sending the encrypted traffic data and the encrypted second authentication information to a second entity;
(h) decrypting the second authentication information using a third corresponding key, and electronically authenticating the first entity; and
(i) decrypting the traffic data using a first corresponding key at the second entity, such that neither the first nor second entity can access both the data and the authentication and verification information for the source, and a secure connection is established between the source and second entity without the second entity accessing the information for the source, wherein the first corresponding key is a private key, and analyzing the traffic data to determine a traffic characteristic.

7. The method as set forth in claim 6, wherein authenticating the probe vehicle at the first entity, and authenticating the first entity at the second entity, involves one or more challenge/response-based protocols.

8. The method as set forth in claim 6, wherein authenticating the probe vehicle at the first entity, and authenticating the first entity at the second entity, involves one or more password-based protocols.

* * * * *